United States Patent
Coady et al.

(10) Patent No.: US 10,756,826 B1
(45) Date of Patent: Aug. 25, 2020

(54) NETWORK OPTIMIZATION USING QUANTUM COMMUNICATION DRIVERS

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/391,819

(22) Filed: Apr. 23, 2019

(51) Int. Cl.
*G06F 15/173* (2006.01)
*H04B 10/90* (2013.01)

(52) U.S. Cl.
CPC .................................. *H04B 10/90* (2013.01)

(58) Field of Classification Search
CPC ........ H04B 10/90; H04B 10/70; H04B 10/85; H04L 9/082; H04L 9/30; H04L 9/08; H04L 67/327; H04L 47/82
USPC ......................................................... 709/238
See application file for complete search history.

(56) References Cited

U.S. PATENT DOCUMENTS

| 9,275,011 | B2 | 3/2016 | Svore et al. | |
|---|---|---|---|---|
| 9,413,470 | B1* | 8/2016 | Smith | H04B 10/70 |
| 2009/0015447 | A1* | 1/2009 | Kilbank | B82Y 10/00 341/60 |
| 2017/0026288 | A1* | 1/2017 | Yang | H04L 45/745 |
| 2018/0276555 | A1 | 9/2018 | Weichenberger | |
| 2018/0330264 | A1 | 11/2018 | Lanting et al. | |
| 2019/0018912 | A1 | 1/2019 | Mosca et al. | |

OTHER PUBLICATIONS

Li, Yaqiao, "Superdense Coding and Quantum Teleportation," Apr. 7, 2017, McGill University, 6 pages.
Panigrahi, Prasanta, et al., "Teleportation, Quantum Information Splitting and Dense Coding through Cluster Brown States," International School and Conference on Quantum Information, Mar. 2008, 41 pages.
Wilde, Mark, et al., "Focus: Saving Space with Quantum Information," Physics Review Letters, vol. 7, Issue 106, Oct. 17, 2014, 4 pages.

(Continued)

Primary Examiner — Tu T Nguyen
(74) *Attorney, Agent, or Firm* — Withrow & Terranova, PLLC

(57) ABSTRACT

Performing network optimization using quantum communication driver (QCD) computing devices based on measured network attributes of a communications network is disclosed. In one example, an interceptor proxy computing device receives a message sent by a sending computing device and directed to a recipient computing device via a communications network. The interceptor proxy computing device determines, based on a network attribute of the communications network, whether to perform network optimization for the communications network. If so, the interceptor proxy computing device sends the message to a QCD computing device, which performs superdense encoding of the message using one or more first qubits that are each in an entangled state with a corresponding one or more second qubits of a QCD computing device coupled to the recipient computing device. The first qubit(s) are then sent to the QCD computing device coupled to the recipient computing device.

20 Claims, 12 Drawing Sheets

(56) References Cited

OTHER PUBLICATIONS

Cortese, John, et al., "Loading Classical Data into a Quantum Computer," Lincoln Laboratory, Mar. 5, 2018, Massachusetts Intstitute of Technology, 38 pages.

Ozols, Maris, "Quantum Information Processing Protocols," Quantum Computing, Lecture 5, cl.cam.ac.uk/teaching/1617/QuantComp/slides5.pdf, accessed Feb. 22, 2019, 10 pages.

* cited by examiner

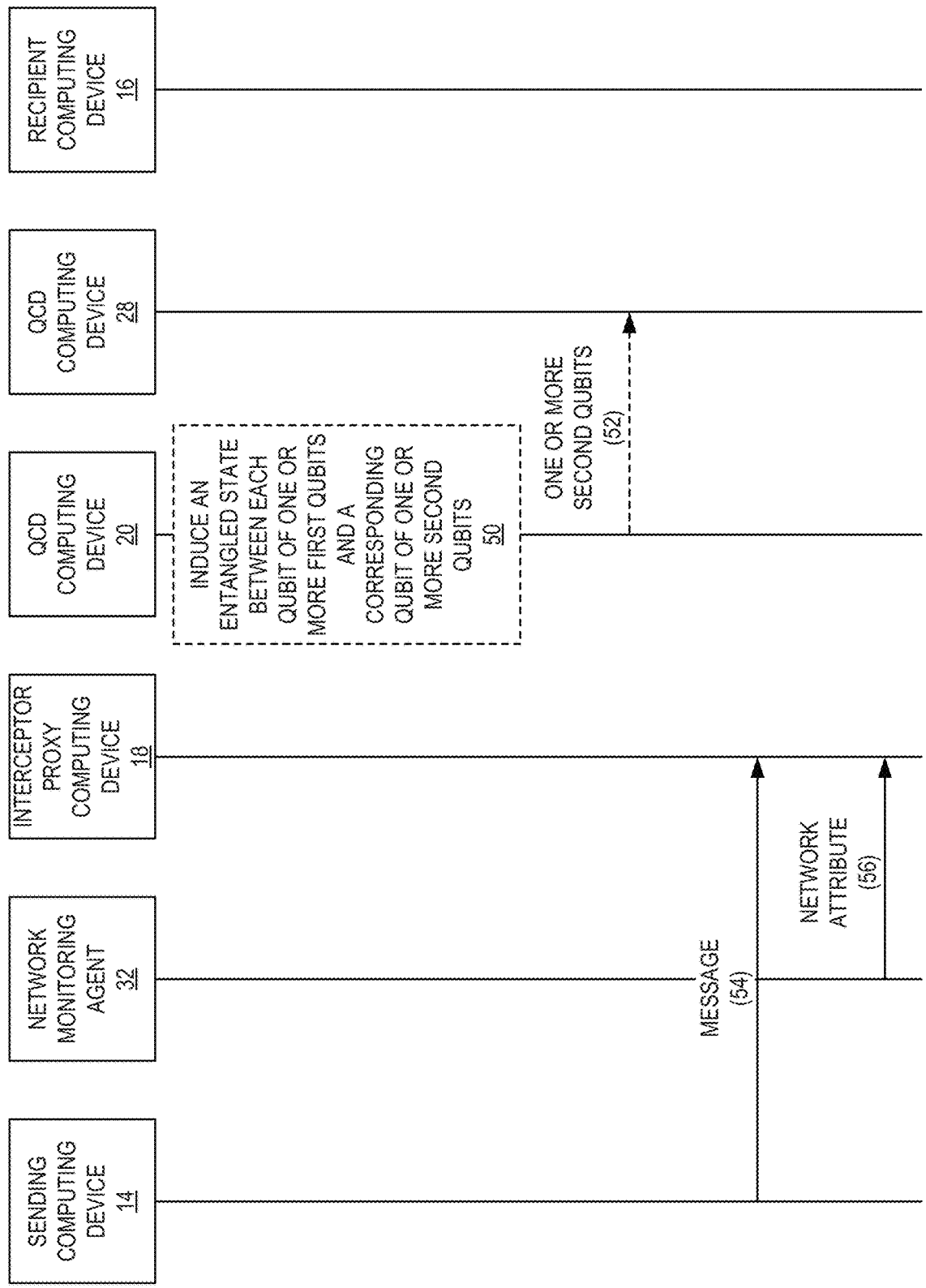

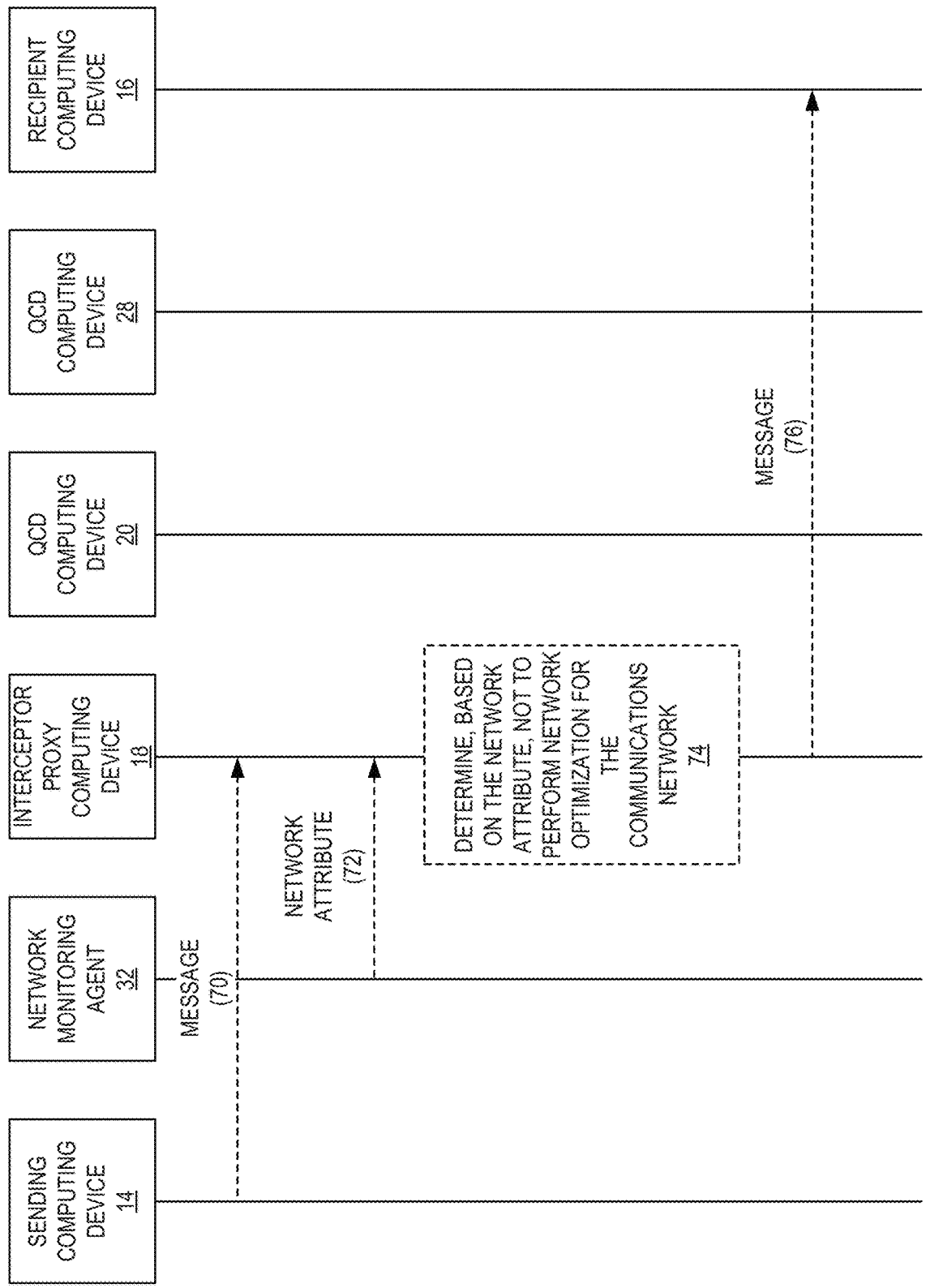

NETWORK OPTIMIZATION USING QUANTUM COMMUNICATION DRIVERS

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement.

SUMMARY

The examples disclosed herein relate to performing network optimization using quantum communication driver (QCD) computing devices based on measured network attributes of a communications network. In one example, an interceptor proxy computing device receives a message sent by a sending computing device and directed to a recipient computing device via a communications network. The interceptor proxy computing device determines, based on a network attribute of the communications network (e.g., a measurement of available network bandwidth or current network latency, as non-limiting examples), whether to perform network optimization for the communications network. If so, the interceptor proxy computing device sends the message to a QCD computing device, which performs superdense encoding of the message using one or more first qubits that are each in an entangled state with a corresponding one or more second qubits of a QCD computing device coupled to the recipient computing device. The superdense encoding of the message manipulates each of the first qubit(s) to encode two bits of the message, effectively halving the size of the message to be transmitted. The first qubit(s) are then sent to the QCD computing device coupled to the recipient computing device, which, according to some examples, may decode the message using the first qubit(s) and the second qubit(s).

In another example, a method is provided. The method comprises receiving, by an interceptor proxy computing device, a first message sent by a sending computing device via a communications network and directed to a recipient computing device. The method further comprises receiving, by the interceptor proxy computing device, a first network attribute of the communications network from a network monitoring agent. The method also comprises determining, based on the first network attribute, to perform network optimization for the communications network. The method additionally comprises, responsive to determining to perform network optimization for the communications network, performing, by a first QCD computing device communicatively coupled to the interceptor proxy computing device, superdense encoding of the first message using one or more first qubits that are each in an entangled state with a corresponding one or more second qubits of a second QCD computing device communicatively coupled to the recipient computing device. The method further comprises sending the one or more first qubits to the second QCD computing device.

In another example, a computing system is provided. The computing system comprises a first QCD computing device that includes a system memory and a quantum processor device coupled to the system memory and implementing one or more first qubits. The computing system further comprises an interceptor proxy computing device that is communicatively coupled to the first QCD computing device, and that includes a system memory and a processor device coupled to the system memory. The processor device is to receive a first message sent by a sending computing device via a communications network and directed to a recipient computing device. The processor device is further to receive a first network attribute of the communications network from a network monitoring agent. The processor device is also to determine, based on the first network attribute, to perform network optimization for the communications network. The processor device is additionally to, responsive to determining to perform network optimization for the communications network, send the first message to the first QCD computing device for superdense encoding. The quantum processor device of the first QCD computing device is to perform superdense encoding of the first message using the one or more first qubits that are each in an entangled state with a corresponding one or more second qubits of a second QCD computing device communicatively coupled to the recipient computing device. The quantum processor device is further to send the one or more first qubits to the second QCD computing device.

In another example, a computer program product stored on a non-transitory computer-readable storage medium is provided. The computer program product includes instructions configured to cause one or more processor devices to receive a first message sent by a sending computing device via a communications network and directed to a recipient computing device. The instructions further cause the one or more processor devices to receive a first network attribute of the communications network from a network monitoring agent. The instructions also cause the one or more processor devices to determine, based on the first network attribute, to perform network optimization for the communications network. The instructions additionally cause the one or more processor devices to perform superdense encoding of the first message using one or more first qubits that are each in an entangled state with a corresponding one or more second qubits of a second QCD computing device communicatively coupled to the recipient computing device, responsive to determining to perform network optimization for the communications network. The instructions further cause the one or more processor devices to send the one or more first qubits to the second QCD computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 2A-2D are messaging diagrams illustrating communication flows among elements of the communications network of FIG. 1 for providing network optimization using quantum communication driver (QCD) computing devices, according to one example;

DETAILED DESCRIPTION

Figure 1:
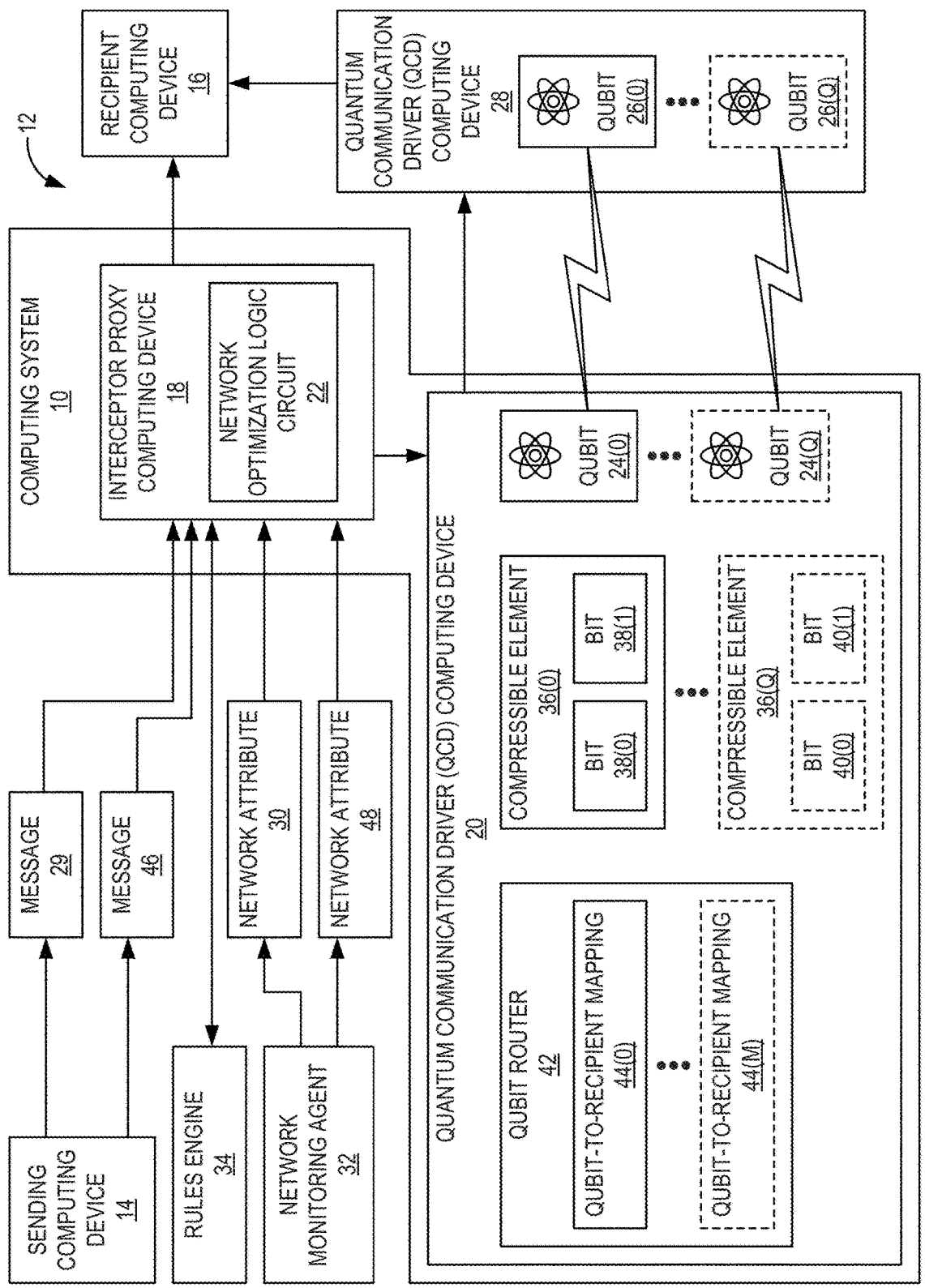
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement.

The phenomenon of entanglement underlies a quantum communication protocol known as "superdense encoding," which allows two classical bits of information to be transmitted from a sender to a recipient by sending only one qubit from the sender to the recipient. To use superdense encoding, the sender and the recipient each must first be in possession of one qubit of a pair of entangled qubits. The sender can then encode two classical bits of information by manipulating the sender's entangled qubit (i.e., by performing a quantum gate operation such as a bit flip operation and/or a phase flip operation, as non-limiting examples), which allows the sender to prearrange the result of the recipient's measurement of the pair of entangled qubits. After the sender sends the entangled qubit to the recipient, the recipient can then perform measurements on the pair of entangled qubits to decode the two classical bits of information.

Superdense encoding can be leveraged to decrease the number of data bits transmitted via a communications network by half, and as a result may offer benefits in terms of network optimization and bandwidth management, particularly when designing cloud-based service architectures. Superdense encoding may prove especially beneficial for services that have a sensitivity to network availability, and thus require network access that is subject to legal contracts such as service level agreements. However, the operating environment of current quantum computing devices poses challenges to the widespread use of superdense encoding. For example, to prevent quantum decoherence of the qubits, a quantum computing device may require isolation from the external world, and may also require extremely low operating temperatures (e.g., as low as 20 millikelvins).

In this regard, the examples herein relate to network optimization using quantum communication driver (QCD) computing devices. In some examples, an interceptor proxy computing device receives a message sent from a sending computing device and directed to a recipient computing device via a communications network. Based on a network attribute received from a network monitoring agent, the interceptor proxy computing device determines whether or not to perform network optimization for the message. If not, the interceptor proxy computing device sends the message to the recipient computing device via the communications network (i.e., in conventional fashion). However, if the interceptor proxy computing device determines to perform network optimization, the interceptor computing device sends the message to a first QCD computing device. The first QCD computing device performs superdense encoding of the message using one or more first qubits that are each in an entangled state with a corresponding one or more second qubits of a second QCD computing device coupled to the recipient computing device. The first qubit(s) are then sent to the second QCD computing device coupled to the recipient computing device, which, according to some examples, may decode the message using the first qubit(s) and the second qubit(s). In this manner, messages can be selectively compressed using superdense encoding when network conditions are less than optimal, resulting in decreased network throughput and increased bandwidth.

FIG. 1 is a block diagram of a computing system 10 in which examples may be practiced. The computing system 10 is part of a communications network 12, which also includes a sending computing device 14 and a recipient computing device 16 that are both communicatively coupled to the computing system 10 via the communications network 12. The computing system 10 includes an interceptor proxy computing device 18 that is communicatively coupled to a QCD computing device 20. In the example of FIG. 1, the interceptor proxy computing device 18 is a classical computing device, while the QCD computing device 20 is a quantum computing device. The interceptor proxy computing device 18 includes a network optimization logic circuit 22, which comprises logic circuits for performing the operations described herein.

The QCD computing device 20 maintains a set of one or more first qubits 24(0)-24(Q), which are in an state of entanglement with a set of one or more second qubits 26(0)-26(Q) that are maintained by a QCD computing device 28 (i.e., another quantum computing device) communicatively coupled to the recipient computing device 16. According to some examples, prior to the computing system 10 performing network optimization, the QCD computing device 20 may induce an entangled state between each qubit of the one or more first qubits 24(0)-24(Q) and a corresponding qubit of the one or more second qubits 26(0)-26(Q), and then send the one or more second qubits 26(0)-26(Q) to the QCD computing device 28. Inducing the entangled state between the one or more first qubits 24(0)-24(Q) and the one or more second qubits 26(0)-26(Q) may be performed, e.g., using Quantum Assembly (QASM) files to apply a Hadamard gate to each of the one or more first qubits 24(0)-24(Q) to place them a state of superposition, and then apply a CNOT gate to each of the one or more second qubits 26(0)-26(Q), as a non-limiting example. Likewise, qubits such as the one or more first qubits 24(0)-24(Q) and the one or more second qubits 26(0)-26(Q) may be sent from the QCD computing device 20 to the QCD computing device 28 in the form of photons transmitted via fiber optic cabling or through free space using pulsed lasers, as non-limiting examples.

The interceptor proxy computing device 18 of the computing system 10 of FIG. 1 receives a message 29 (e.g., comprising two or more bits of classical information) sent by the sending computing device 14 via the communications network 12 and directed to the recipient computing device 16. The interceptor proxy computing device 18, according to some examples, may be configured to act as a network proxy or a network demilitarized zone or DMZ. The interceptor proxy computing device 18 also receives a network attribute 30 from a network monitoring agent 32 of the communications network 12. The network monitoring agent 32 is tasked with monitoring network conditions such as but not limited to network latency, throughput, bandwidth, and the like. The network attribute 30 indicates a current state or value of one such network condition monitored by the network monitoring agent 32.

Based on the network attribute 30, the interceptor proxy computing device 18 determines whether or not to perform network optimization for the communications network 12. In some examples, this determination may be made by comparing a value of the network attribute 30 to a specified threshold (e.g., comparing a current network bandwidth to a minimum bandwidth threshold). According to some examples, this determination may be based on one or more rules provided by a rules engine 34 of the communications network 12.

If the interceptor proxy computing device 18 determines to perform network optimization, the interceptor proxy computing device 18 sends the message 29 to the QCD computing device 20 for superdense encoding. In some examples, the QCD computing device 20 may perform superdense encoding by first dividing the message 29 into one or more compressible elements 36(0)-36(Q) of two classical bits each. In the example of FIG. 1, the compressible element 36(0) includes bits 38(0)-38(1), while the compressible element 36(Q) includes bits 40(0)-40(1). Each of the compressible elements 36(0)-36(Q) corresponds to one of the first qubits 24(0)-24(Q) used to perform the superdense encoding.

Some examples may provide that the QCD computing device 20 is configured to provide communications with a plurality of recipient computing devices, and accordingly the QCD computing device 20 may maintain a corresponding plurality of sets of qubits that are in an entangled state with sets of qubits maintained by the recipient computing devices. The QCD computing device 20 thus may include a qubit router 42 that maintains one or more qubit-to-recipient mappings 44(0)-44(M). Each qubit-to-recipient mapping 44(0)-44(M) associates a set of qubits maintained by the QCD computing device 20, such as the one or more first qubits 24(0)-24(Q), with a corresponding recipient computing device maintaining a corresponding set of entangled qubits (e.g., the recipient computing device 16 and the one or more second qubits second 26(0)-26(Q)). In such examples, operations for performing the superdense encoding of the message 29 may include accessing the one or more qubit-to-recipient mappings 44(0)-44(M), and identifying the one or more first qubits 24(0)-24(Q) based on a qubit-to-recipient mapping of the one or more qubit-to-recipient mappings 44(0)-44(M). Superdense encoding may then be performed (e.g., by transforming a Bell state of a corresponding qubit of the one or more first qubits 24(0)-24(Q), as a non-limiting example).

After performing the superdense encoding, the QCD computing device 20 sends the one or more first qubits 24(0)-24(Q) to the QCD computing device 28 that is communicatively coupled to the recipient computing device 16. In some examples, upon receiving the one or more first qubits 24(0)-24(Q) from the QCD computing device 20, the QCD computing device 28 decodes the message 29 using the one or more first qubits 24(0)-24(Q) and the one or more second qubits 26(0)-26(Q). The decoded message may then be provided to the recipient computing device 16.

The interceptor proxy computing device 18 in some examples may also determine not to perform network optimization if unwarranted by network conditions. For instance, the interceptor proxy computing device 18 may receive a message 46 from the sending computing device 14 and directed to the recipient computing device 16. The interceptor proxy computing device 18 may also receive a network attribute 48 that indicates that current network conditions do not warrant network optimization. Based on the network attribute 48, the interceptor proxy computing device 18 may determine not to perform network optimization, and may send the message 46 to the recipient computing device 16 via the communications network 12 (i.e., in conventional fashion).

FIGS. 2A-2D illustrate communication flows among elements of the communications network 12 of FIG. 1 for providing network optimization using QCD computing devices, according to one example. Elements of FIG. 1 are referenced in describing FIGS. 2A-2D for the sake of clarity. As seen in FIGS. 2A-2D, each of the sending computing device 14, the network monitoring agent 32, the interceptor proxy computing device 18, the QCD computing device 20, the QCD computing device 28, and the recipient computing device 16 are represented by vertical lines, with communications between these elements illustrated by captioned arrows, and operations performed by each element illustrated by captioned boxes.

Figure 2B:
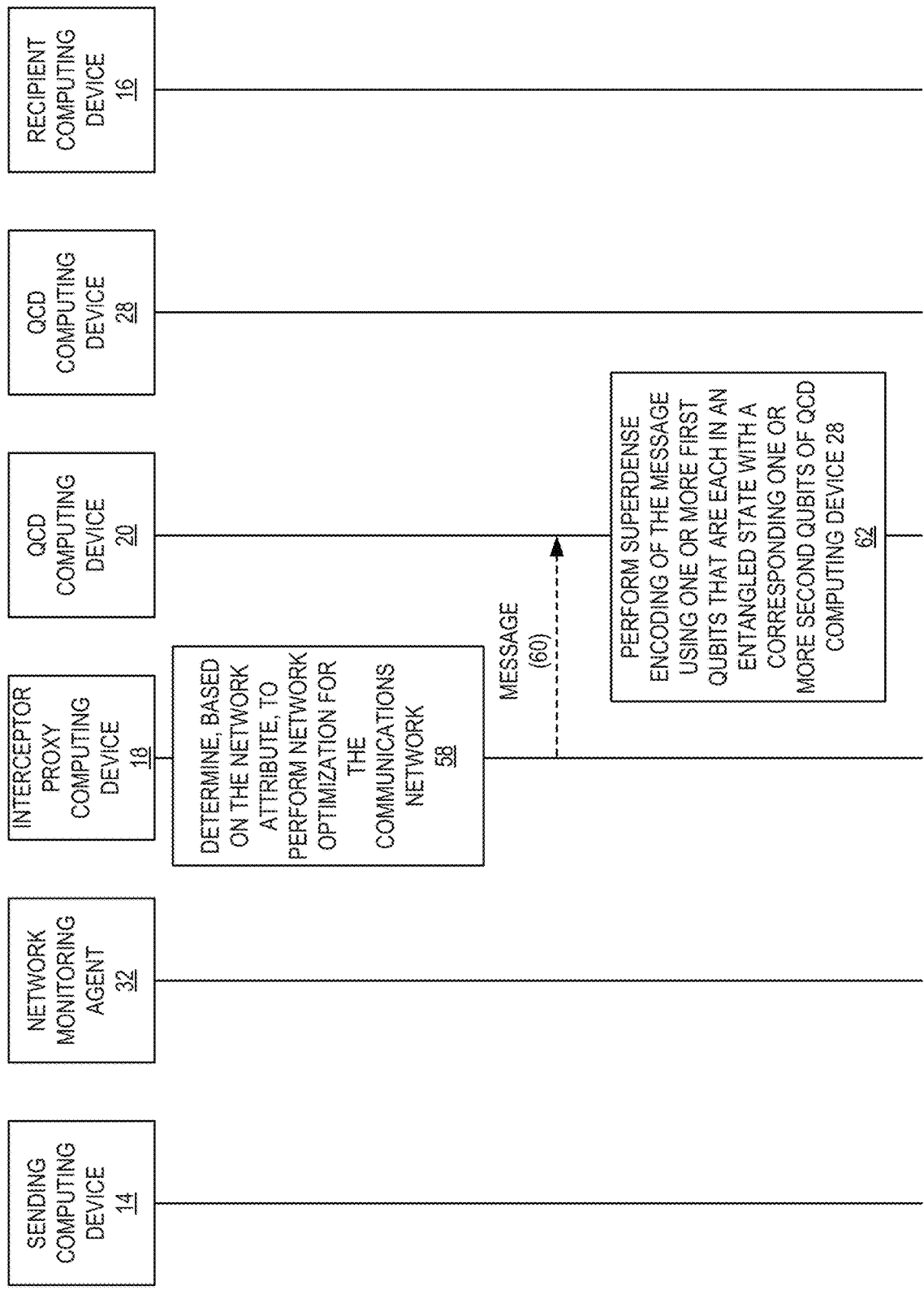

In the example of FIG. 2A, operations according to some examples begin with the QCD computing device 20 inducing an entangled state between each qubit of one or more first qubits 24(0)-24(Q) and a corresponding qubit of one or more second qubits 26(0)-26(Q), as indicated by block 50. The QCD computing device 20 then sends the one or more second qubits 26(0)-26(Q) to the recipient computing device 16, as indicated by arrow 52. The interceptor proxy computing device 18 next receives the message 29 from the sending computing device 14, as indicated by arrow 54. The interceptor proxy computing device 18 also receives the network attribute 30 from the network monitoring agent 32, as indicated by arrow 56. Processing then resumes in FIG. 2B.

Referring now to FIG. 2B, the interceptor proxy computing device 18 determines, based on the network attribute 30, to perform network optimization for the communications network 12, as indicated by block 58. Accordingly, the interceptor proxy computing device 18 according to some examples sends the message 29 to the QCD computing device 20 for superdense encoding, as indicated by arrow 60. The QCD computing device 20 then performs superdense encoding of the message 29 using the one or more first qubits 24(0)-24(Q) that are each in an entangled state with the corresponding one or more second qubits 26(0)-26(Q) of the QCD computing device 28, as indicated by block 62. Processing then continues in FIG. 2C.

Figure 2C:
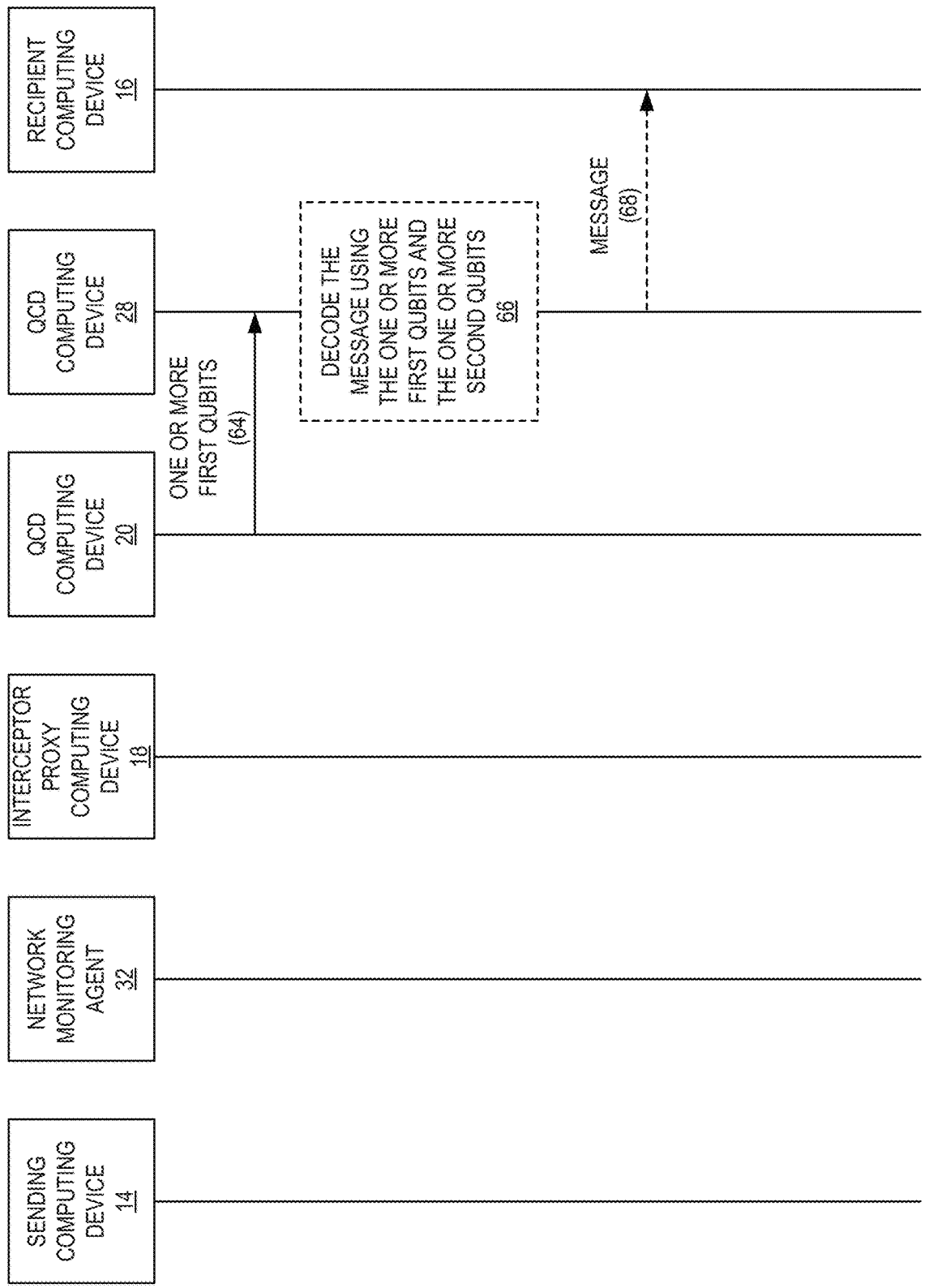

Turning to FIG. 2C, the QCD computing device 20, after performing the superdense encoding of the message 29, sends the one or more first qubits 24(0)-24(Q) to the QCD computing device 28, as indicated by arrow 64. According to some examples, the QCD computing device 28 may then decode the message 29 using the one or more first qubits 24(0)-24(Q) and the one or more second qubits 26(0)-26(Q), as indicated by block 66. The decoded message 29 may then be provided to the recipient computing device 16, as indicated by arrow 68. Processing in some examples may then continue in FIG. 2D.

In FIG. 2D, the interceptor proxy computing device 18 may receive the message 46 sent by the sending computing device 14 via the communications network 12 and directed to the recipient computing device 16, as indicated by arrow 70. The interceptor proxy computing device 18 may also receive the network attribute 48 from the network monitoring agent 32, as indicated by arrow 72. In this example, the interceptor proxy computing device 18 determines, based on the network attribute 48, not to perform network optimization for the communications network 12, as indicated by block 74. Consequently, instead of sending the message 46 to the QCD computing device 20 for superdense encoding, the interceptor proxy computing device 18 sends the message 46 to the recipient computing device 16 via the communications network 12 (i.e., in conventional fashion), as indicated by arrow 76.

Figure 3A:
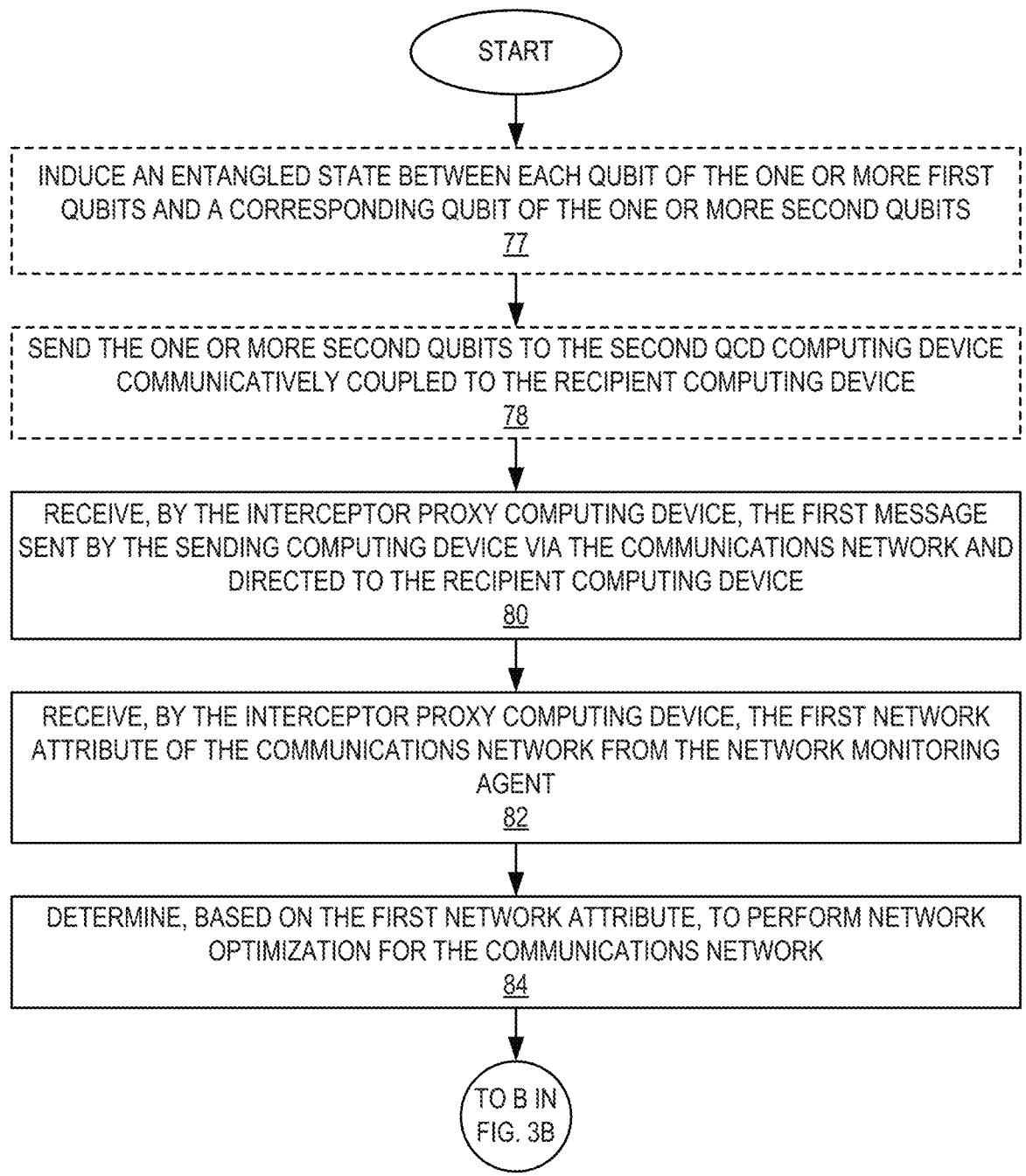
FIGS. 3A-3C are flowcharts illustrating operations for providing network optimization using superdense encoding employing entangled qubits, according to one example.
Figure 3B:
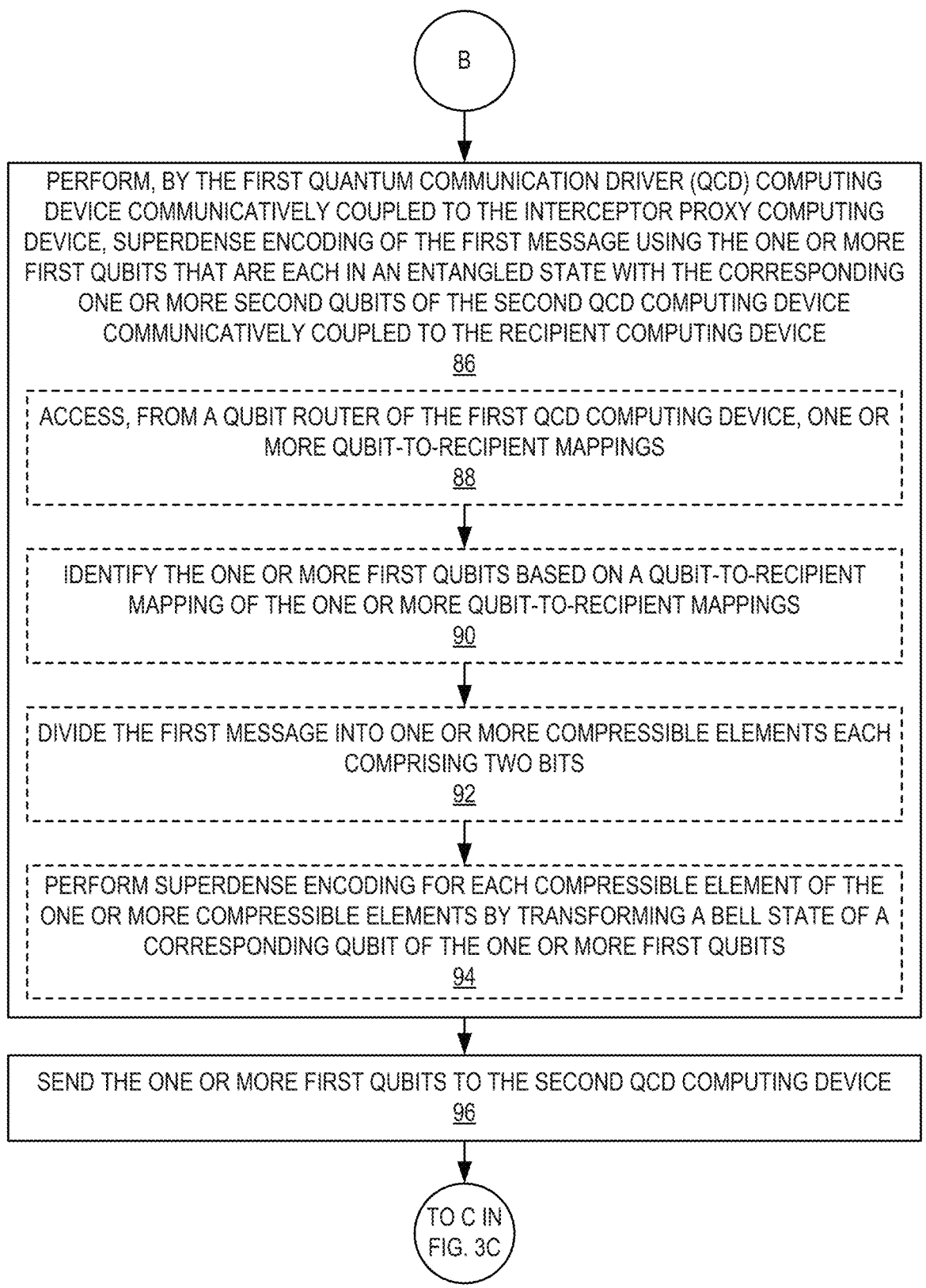
Figure 3C:
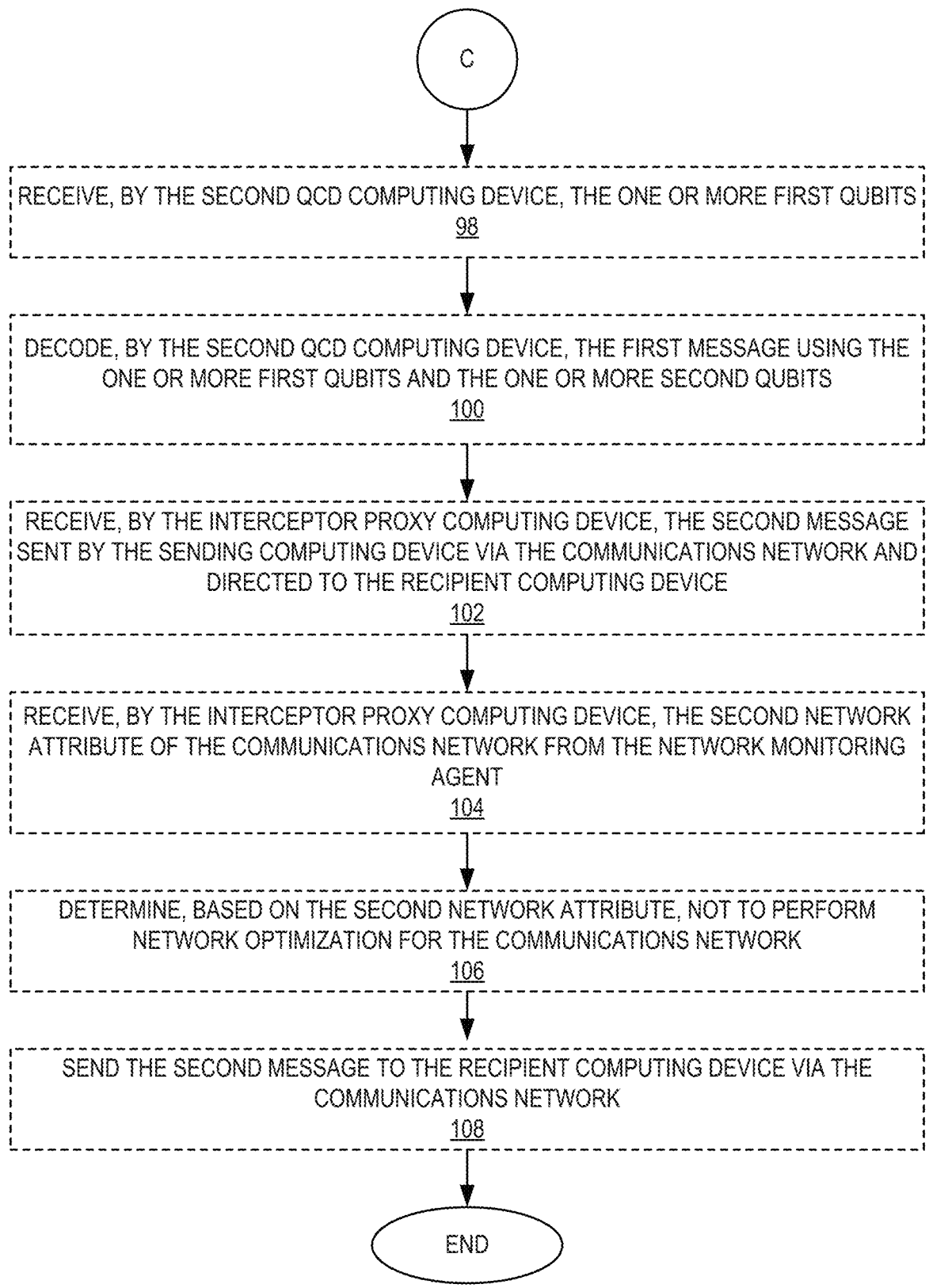

To illustrate operations for providing network optimization using superdense encoding employing entangled qubits according to one example FIGS. 3A-3C are provided. Elements of FIG. 1 are referenced in describing FIGS. 3A-3C for the sake of clarity. Operations according to some examples begin in FIG. 3A with a first QCD computing device, such as the QCD computing device 20, inducing an entangled state between each qubit of the one or more first qubits 24(0)-24(Q) and a corresponding qubit of the one or more second qubits 26(0)-26(Q) (block 77). The first QCD computing device 20 in such examples may then send the one or more second qubits 26(0)-26(Q) to a second QCD computing device (e.g., the QCD computing device 28) communicatively coupled to the recipient computing device 16 (block 78).

The interceptor proxy computing device 18 receives a first message, such as the message 29, sent by the sending computing device 14 via the communications network 12 and directed to the recipient computing device 16 (block 80). The interceptor proxy computing device 18 also receives a first network attribute of the communications network 12, such as the network attribute 30, from the network monitoring agent 32 (block 82). The interceptor proxy computing device 18 then determines, based on the first network attribute 30, to perform network optimization for the communications network 12 (block 84). Processing then resumes at block 86 of FIG. 3B.

Referring now to FIG. 3B, the QCD computing device 20, in response to the interceptor proxy computing device 18 determining to perform network optimization, performs superdense encoding of the first message 29 using the one or more first qubits 24(0)-24(Q) that are each in an entangled state with the corresponding one or more second qubits 26(0)-26(Q) of the second QCD computing device 28 communicatively coupled to the recipient computing device 16 (block 86). In some examples, the operations of block 86 for performing the superdense encoding of the first message 29 may include accessing, from the qubit router 42 of the first QCD computing device 20, the one or more qubit-to-recipient mappings 44(0)-44(M) (block 88). The first QCD computing device 20 may then identify the one or more first qubits 24(0)-24(Q) based on a qubit-to-recipient mapping of the one or more qubit-to-recipient mappings (block 90). Some examples may provide that the operations of block 86 for performing the superdense encoding of the first message include first dividing the first message 29 into one or more compressible elements 36(0)-36(Q) each comprising two bits 38(0)-38(1), 40(0)-40(1) (block 92). The first QCD computing device 20 then performs superdense encoding for each compressible element of the one or more compressible elements by transforming a Bell state of a corresponding qubit of the one or more first qubits 24(0)-24(Q) (block 94). After performing the superdense encoding of the first message 29, the first QCD computing device 20 sends the one or more first qubits 24(0)-24(Q) to the second QCD computing device 28 (block 96). Processing then resumes at block 98 of FIG. 3C.

As seen in FIG. 3C, some examples of the second QCD computing device 28 receive the one or more first qubits 24(0)-24(Q) (block 98). The second QCD computing device 28 may then decode the first message 29 using the one or more first qubits 24(0)-24(Q) and the one or more second qubits 26(0)-26(Q) (block 100). In some examples, the interceptor proxy computing device 18 may receive a second message, such as the message 46, sent by the sending computing device 14 via the communications network 12 and directed to the recipient computing device 16 (block 102). The interceptor proxy computing device 18 may also receive a second network attribute of the communications network 12, such as the network attribute 48, from the network monitoring agent 32 (block 104). The interceptor proxy computing device 18 may determine, based on the second network attribute 48, not to perform network optimization for the communications network 12 (block 106). As a result, the interceptor proxy computing device 18 sends the second message 46 to the recipient computing device 16 via the communications network 12 (block 108).

Figure 4:
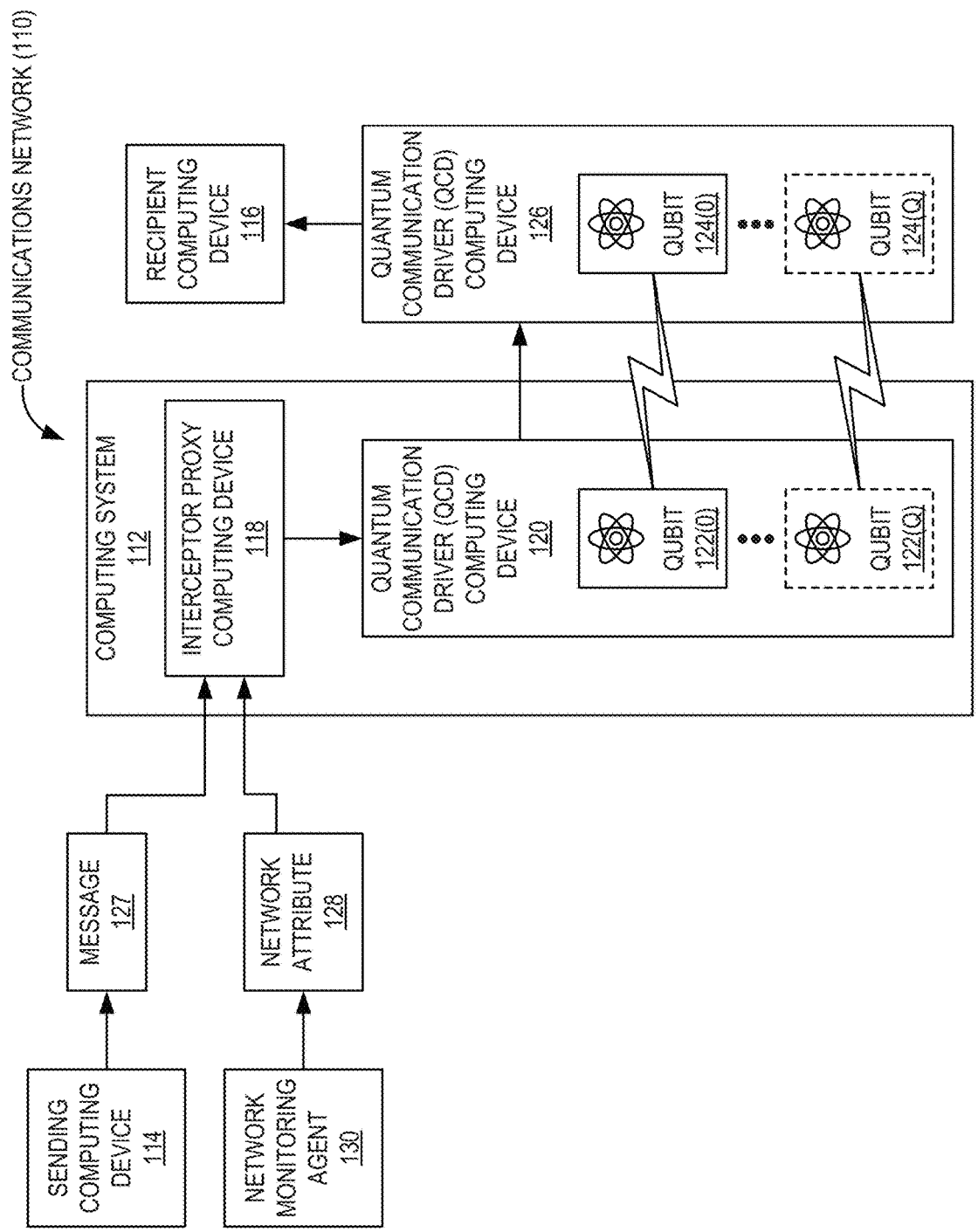
FIG. 4 is a simpler block diagram of the computing system of FIG. 1 for providing network optimization using QCD computing devices, according to one example.

FIG. 4 is a simpler block diagram of the communications network 12 of FIG. 1 for providing network optimization using QCD computing devices, according to one example. In FIG. 4, a computing system 112 is part of a communications network 110, which also includes a sending computing device 114 and a recipient computing device 116 that are both communicatively coupled to the computing system 112 via the communications network 110. The computing system 112 includes an interceptor proxy computing device 118 that is communicatively coupled to a QCD computing device 120. In examples according to FIG. 4, the interceptor proxy computing device 118 is a classical computing device, while the QCD computing device 120 is a quantum computing device.

The QCD computing device 120 maintains a set of one or more first qubits 122(0)-122(Q), which are in an state of entanglement with a set of one or more second qubits 124(0)-124(Q) that are maintained by a QCD computing device 126 (i.e., another quantum computing device) communicatively coupled to the recipient computing device 116. The interceptor proxy computing device 118 of the computing system 112 of FIG. 4 receives a message 127 (e.g., comprising two or more bits of classical information) sent by the sending computing device 114 via the communications network 110 and directed to the recipient computing device 116. The interceptor proxy computing device 118, according to some examples, may be configured to act as a network proxy or a network demilitarized zone or DMZ. The interceptor proxy computing device 118 also receives a network attribute 128 from a network monitoring agent 130 of the communications network 110. The network monitoring agent 130 is tasked with monitoring network conditions such as but not limited to network latency, throughput, bandwidth, and the like. The network attribute 128 indicates a current state or value of one such network condition monitored by the network monitoring agent 130.

Based on the network attribute 128, the interceptor proxy computing device 118 determines to perform network optimization for the communications network 110. In some examples, this determination may be made by comparing a value of the network attribute 128 to a specified threshold (e.g., comparing a current network bandwidth to a minimum bandwidth threshold). In response to determining to perform network optimization, the interceptor proxy computing device 118 sends the message 127 to the QCD computing device 120 for superdense encoding using the one or more first qubits 122(0)-122(Q). After performing the superdense encoding, the QCD computing device 120 sends the one or more first qubits 122(0)-122(Q) to the QCD computing device 126 that is communicatively coupled to the recipient computing device 116.

Figure 5:
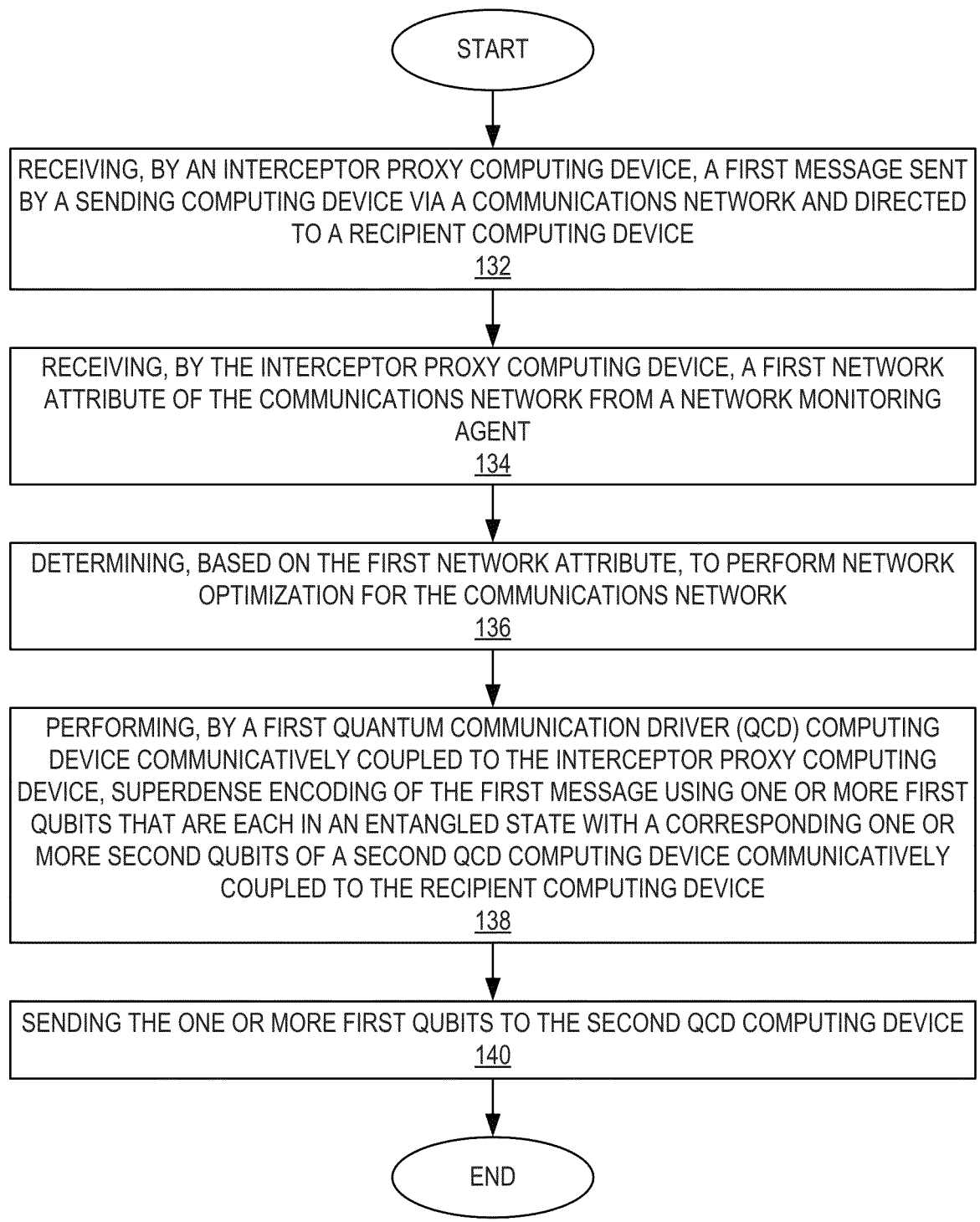
FIG. 5 is a flowchart of a simplified method for providing network optimization using QCD computing devices, according to one example.

FIG. 5 is a flowchart of a simplified method for providing network optimization using QCD computing devices. Elements of FIG. 4 are referenced in describing FIG. 5, for the sake of clarity. In FIG. 5, operations begin with the interceptor proxy computing device 118 receiving a first message, such as the message 127, sent by the sending computing device 114 via the communications network 110 and directed to the recipient computing device 116 (block 132). The interceptor proxy computing device 118 also receives a first network attribute of the communications network 110, such as the network attribute 128, from the network monitoring agent 130 (block 134). The interceptor proxy computing device 118 determines, based on the first network attribute 128, to perform network optimization for the communications network 110 (block 136).

In response to the interceptor proxy computing device 118 determining to perform network optimization, a first QCD computing device, such as the QCD computing device 120 communicatively coupled to the interceptor proxy computing device 118, performs superdense encoding of the first message 127 using the one or more first qubits 122(0)-122(Q) that are each in an entangled state with a corresponding one or more second qubits 124(0)-124(Q) of a second QCD computing device (e.g., the QCD computing device 126) communicatively coupled to the recipient computing device 116 (block 138). The first QCD computing device 120 then sends the one or more first qubits 122(0)-122(Q) to the second QCD computing device 126 (block 140).

Figure 6:
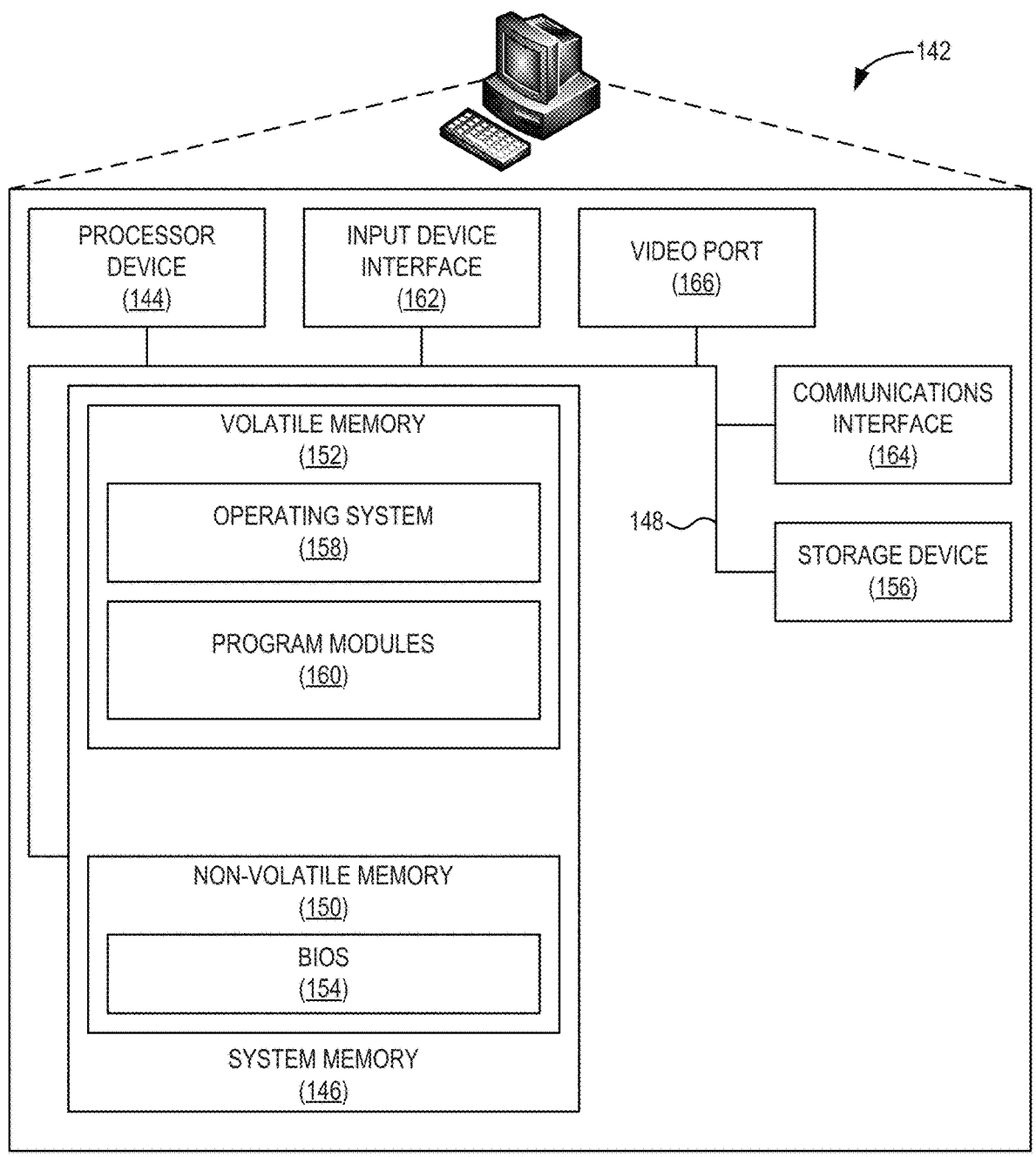
FIG. 6 is a block diagram of a computing device suitable for implementing examples, according to one example.

FIG. 6 is a block diagram of a processor-based computing device 142 ("computing device 142" or "classical computing device 142"), such as the interceptor proxy computing device 118, the sending computing device 14, and the recipient computing device 116 of FIG. 1, suitable for implementing examples according to one example. The computing device 142 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 142 includes a processor device 144, a system memory 146, and a system bus 148. The system bus 148 provides an interface for system components including, but not limited to, the system memory 146 and the processor device 144. The processor device 144 can be any commercially available or proprietary processor.

The system bus 148 may be any of several types of bus structures that may further interconnect to a memory bus (with or without a memory controller), a peripheral bus, and/or a local bus using any of a variety of commercially available bus architectures. The system memory 146 may include non-volatile memory 150 (e.g., read-only memory (ROM), erasable programmable ROM (EPROM), electrically EPROM (EEPROM), etc.), and volatile memory 152 (e.g., RAM). A basic input/output system (BIOS) 154 may be stored in the non-volatile memory 150 and can include the basic routines that help to transfer information among elements within the computing device 142. The volatile memory 152 may also include a high-speed RAM, such as static RAM, for caching data.

The computing device 142 may further include or be coupled to a non-transitory computer-readable storage medium such as a storage device 156, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 156 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 156 and in the volatile memory 152, including an operating system 158 and one or more program modules 160 which may implement the functionality described herein in whole or in part. It is to be appreciated that the examples can be implemented with various commercially available operating systems 158 or combinations of operating systems 158. All or a portion of the examples may be implemented as a computer program product stored on a transitory or non-transitory computer-usable or computer-readable storage medium, such as the storage device 156, which includes complex programming instructions, such as complex computer-readable program code, to cause the processor device 144 to carry out the steps described herein. Thus, the computer-readable program code can comprise software instructions for implementing the functionality of the examples described herein when executed on the processor device 144. The processor device 144 may serve as a controller, or control system, for the computing device 142 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 144 through an input device interface 162 that is coupled to the system bus 148 but can be connected by other interfaces, such as a parallel port, an Institute of Electrical and Electronic Engineers (IEEE) 1394 serial port, a Universal Serial Bus (USB) port, an IR interface, and the like.

The computing device 142 may also include a communications interface 164 suitable for communicating with a network as appropriate or desired. The computing device 142 may also include a video port 166 to interface with a display device to provide information to a user.

Figure 7:
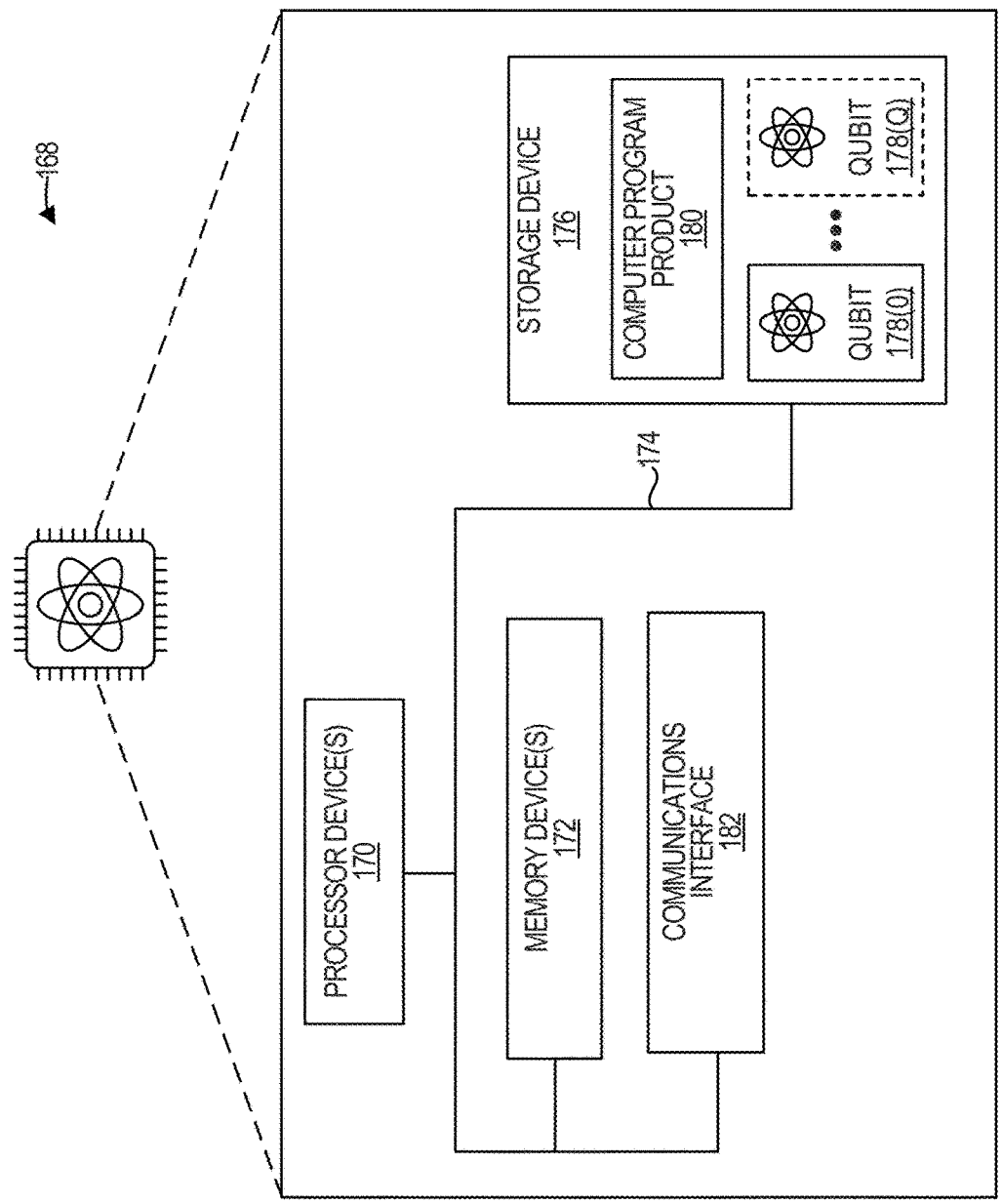
FIG. 7 is a block diagram of a quantum computing device suitable for implementing examples, according to one example.

FIG. 7 is a block diagram of a quantum computing device 168, such as the QCD computing device 20 and the QCD computing device 28 of FIG. 1, suitable for implementing examples according to one example. The quantum computing device 168 may comprise any computing or electronic device capable of including firmware, hardware, and/or executing software instructions to implement the functionality described herein in a quantum environment. The quantum computing device 168 includes the one or more processor devices 170, the one or more memory devices 172, and a system bus 174. The system bus 174 provides an interface for system components including, but not limited to, the one or more memory devices 172 and the one or more processor devices 170. The processor devices 170 can be any commercially available or proprietary processor suitable for operating in a quantum environment. The quantum computing device 168 may further include or be coupled to a non-transitory computer-readable storage medium such as a storage device 176. The storage device 176 and other drives associated with computer-readable media and computer-usable media may provide non-volatile storage of data, data structures, computer-executable instructions, and the like. The storage device 176 may also store one or more qubits 178(0)-178(Q), which may be measured and/or manipulated by the one or more processor devices 170 when performing quantum computing operations.

All or a portion of the examples may be implemented as a computer program product 180 stored on a transitory or non-transitory computer-usable or computer-readable storage medium, such as the storage device 176, which includes complex programming instructions, such as complex computer-readable program code, to cause the one or more processor devices 170 to carry out the steps described herein. Thus, the computer-readable program code can comprise software instructions for implementing the functionality of the examples described herein when executed on the one or more processor devices 170.

An operator may also be able to enter one or more configuration commands through a keyboard (not illustrated), a pointing device such as a mouse (not illustrated), or a touch-sensitive surface. The quantum computing device 168 may also include a communications interface 182 suitable for communicating with other computing devices, including, in some implementations, classical computing devices.

The examples also facilitate an improvement to computer functionality itself via network optimization using QCD computing devices to selectively perform superdense encoding of messages transmitted over a communications network, resulting in improved functionality of computer devices serving as interceptor proxies on the communications network. Thus, the examples are directed to specific improvements in computer functionality.

What is claimed is:

1. A method comprising:
receiving, by an interceptor proxy computing device, a first message sent by a sending computing device via a communications network and directed to a recipient computing device;
receiving, by the interceptor proxy computing device, a first network attribute of the communications network from a network monitoring agent;
determining, based on the first network attribute, to perform network optimization for the communications network; and
responsive to determining to perform network optimization for the communications network:
performing, by a first quantum communication driver (QCD) computing device communicatively coupled to the interceptor proxy computing device, superdense encoding of the first message using one or more first qubits that are each in an entangled state with a corresponding one or more second qubits of a second QCD computing device communicatively coupled to the recipient computing device; and
sending the one or more first qubits to the second QCD computing device.

2. The method of claim 1, further comprising:
receiving, by the interceptor proxy computing device, a second message sent by the sending computing device via the communications network and directed to the recipient computing device;
receiving, by the interceptor proxy computing device, a second network attribute of the communications network from the network monitoring agent;
determining, based on the second network attribute, not to perform network optimization for the communications network; and
responsive to determining not to perform network optimization for the communications network, sending the second message to the recipient computing device via the communications network.

3. The method of claim 1, further comprising, prior to receiving the first message:
inducing the entangled state between each qubit of the one or more first qubits and a corresponding qubit of the one or more second qubits; and
sending the one or more second qubits to the second QCD computing device.

4. The method of claim 1, wherein performing the superdense encoding of the first message comprises:
dividing the first message into one or more compressible elements each comprising two bits; and
performing superdense encoding for each compressible element of the one or more compressible element by transforming a Bell state of a corresponding qubit of the one or more first qubits.

5. The method of claim 1, wherein performing the superdense encoding of the first message comprises:
accessing, from a qubit router of the first QCD computing device, one or more qubits-to-recipient mappings; and
identifying the one or more first qubits based on a qubits-to-recipient mapping of the one or more qubits-to-recipient mappings.

6. The method of claim 1, wherein determining, based on the first network attribute, to perform network optimization for the communications network is based on a rules engine.

7. The method of claim 1, further comprising:
receiving, by the second QCD computing device, the one or more first qubits; and
decoding, by the second QCD computing device, the first message using the one or more first qubits and the one or more second qubits.

8. A computing system comprising:
a first quantum communication driver (QCD) computing device, comprising:
a system memory; and
a quantum processor device coupled to the system memory and implementing one or more first qubits; and
an interceptor proxy computing device communicatively coupled to the first QCD computing device, the interceptor proxy computing device comprising:
a system memory; and
a processor device coupled to the system memory, the processor device to:
receive a first message sent by a sending computing device via a communications network and directed to a recipient computing device;
receive a first network attribute of the communications network from a network monitoring agent;
determine, based on the first network attribute, to perform network optimization for the communications network; and
responsive to determining to perform network optimization for the communications network, send the first message to the first QCD computing device for superdense encoding; and
the quantum processor device of the first QCD computing device to:
perform superdense encoding of the first message using the one or more first qubits that are each in an entangled state with a corresponding one or more second qubits of a second QCD computing device communicatively coupled to the recipient computing device; and
send the one or more first qubits to the second QCD computing device.

9. The computing system of claim 8, wherein the processor device is further to:
receive a second message sent by the sending computing device via the communications network and directed to the recipient computing device;
receive a second network attribute of the communications network from the network monitoring agent;
determine, based on the second network attribute, not to perform network optimization for the communications network; and
responsive to determining not to perform network optimization for the communications network, send the second message to the recipient computing device via the communications network.

10. The computing system of claim 8, wherein the quantum processor device is further to:
induce the entangled state between each qubit of the one or more first qubits and a corresponding qubit of the one or more second qubits; and
send the one or more second qubits to the second QCD computing device.

11. The computing system of claim 8, wherein to perform the superdense encoding of the first message is to:
divide the first message into one or more compressible elements each comprising two bits; and
perform superdense encoding for each compressible element of the one or more compressible elements by transforming a Bell state of a corresponding qubit of the one or more first qubits.

12. The computing system of claim 8, wherein to perform the superdense encoding of the first message is to:
access, from a qubit router of the first QCD computing device, one or more qubits-to-recipient mappings; and
identify the one or more first qubits based on a qubits-to-recipient mapping of the one or more qubits-to-recipient mappings.

13. The computing system of claim 8, wherein to determine, based on the first network attribute, to perform network optimization for the communications network is based on a rules engine.

14. A computer program product stored on a non-transitory computer-readable storage medium and including instructions configured to cause one or more processor devices to:
receive a first message sent by a sending computing device via a communications network and directed to a recipient computing device;
receive a first network attribute of the communications network from a network monitoring agent;
determine, based on the first network attribute, to perform network optimization for the communications network; and
responsive to determining to perform network optimization for the communications network:
perform superdense encoding of the first message using one or more first qubits that are each in an entangled state with a corresponding one or more second qubits of a second QCD computing device communicatively coupled to the recipient computing device; and
send the one or more first qubits to the second QCD computing device.

15. The computer program product of claim 14, wherein the instructions further cause the one or more processor devices to:
receive a second message sent by the sending computing device via the communications network and directed to the recipient computing device;
receive a second network attribute of the communications network from the network monitoring agent;
determine, based on the second network attribute, not to perform network optimization for the communications network; and
responsive to determining not to perform network optimization for the communications network, send the second message to the recipient computing device via the communications network.

16. The computer program product of claim 14, wherein the instructions further cause the one or more processor devices to:
induce the entangled state between each qubit of the one or more first qubits and a corresponding qubit of the one or more second qubits; and
send the one or more second qubits to the second QCD computing device.

17. The computer program product of claim 14, wherein the instructions cause the one or more processor devices to perform the superdense encoding of the first message by causing the one or more processor devices to:
divide the first message into one or more compressible elements each comprising two bits; and perform superdense encoding for each compressible element of the one or more compressible elements by transforming a Bell state of a corresponding qubit of the one or more first qubits.

18. The computer program product of claim 14, wherein the instructions cause the one or more processor devices to perform the superdense encoding of the first message by causing the one or more processor devices to:
  access, from a qubit router of the first QCD computing device, one or more qubits-to-recipient mappings; and
  identify the one or more first qubits based on a qubits-to-recipient mapping of the one or more qubits-to-recipient mappings.

19. The computer program product of claim 14, wherein the instructions cause the one or more processor devices to determine, based on the first network attribute, to perform network optimization for the communications network based on a rules engine.

20. The computer program product of claim 14, wherein the instructions further cause the one or more processor devices to:
  receive the one or more first qubits; and
  decode the first message using the one or more first qubits and the one or more second qubits.

* * * * *